March 10, 1970  J. W. SMITH  3,500,085
ELECTRIC MOTOR AND RECTIFIER ASSEMBLY

Original Filed July 5, 1966  2 Sheets-Sheet 1

INVENTOR:
JAMES W. SMITH
BY Howson & Howson
ATTYS.

March 10, 1970   J. W. SMITH   3,500,085
ELECTRIC MOTOR AND RECTIFIER ASSEMBLY
Original Filed July 5, 1966   2 Sheets-Sheet 2
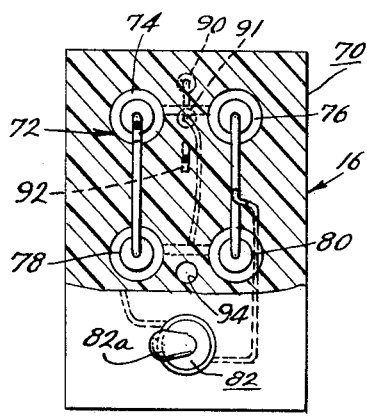
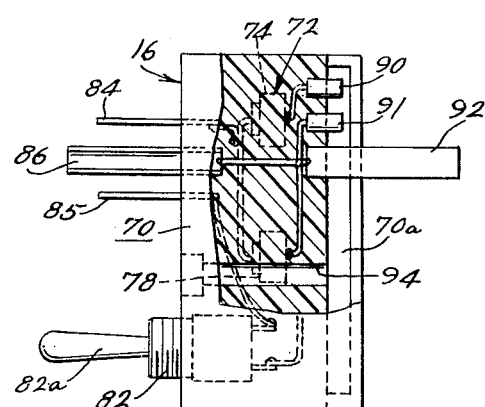
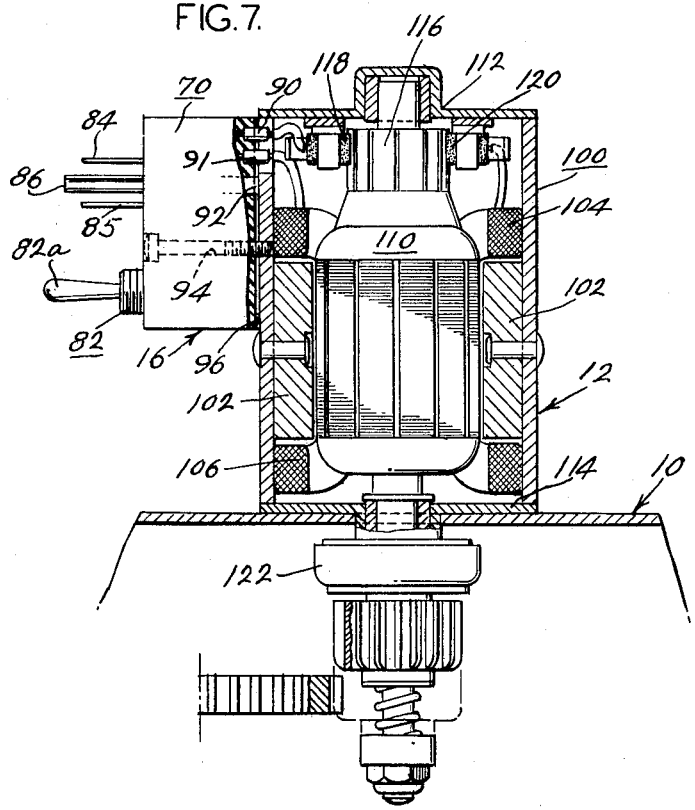
INVENTOR:
JAMES W. SMITH
BY
Howson & Howson
ATTYS.

United States Patent Office 3,500,085
Patented Mar. 10, 1970

3,500,085
ELECTRIC MOTOR AND RECTIFIER ASSEMBLY
James W. Smith, Lavonia, Ga., assignor to AMBAC Industries, Incorporated, Columbus, Miss., a corporation of New York
Continuation of application Ser. No. 562,765, July 5, 1966. This application Feb. 26, 1969, Ser. No. 805,104
Int. Cl. H02k 11/00
U.S. Cl. 310—68     8 Claims

ABSTRACT OF THE DISCLOSURE

A motor and rectifier assembly for use in starting machinery is provided including a direct current motor and rectifier means responsive to alternating current voltage for providing a direct voltage output to the motor. Switch means having an actuator is employed, the actuator being adapted to close contacts and provide an electrical connection through the switch means to the rectifier means. Housing means is provided for embedding and sealing the rectifier means and switch means therein and permitting the actuator to be operatively actuatable.

---

This application is a continuation of application 562,765, filed July 5, 1966, now abandoned.

The present invention relates to an electric motor and rectifier assembly, and, more particularly, to an A.C. starter motor system and rectifier assembly for use therewith.

In recent years there has been a trend to install cranking motors on small engines of the size which previously used a rope or wind-up type mechanical starting device. This trend has been especially pronounced on small machinery, such as, snow plows, lawn mowers and the like, which are used around the home. In the past, some of the disadvantages in adapting an electric starter for this application has been centered around the source of power for operating the electric starter, which is typically an alternating-current line source. Due to the fact that any starter motor must be a very ruggedly constructed unit in order to withstand the stress, strain, and vibration to which it is subjected, it has been found most practical from a cost and performance standpoint to use a solid tubular housing structure with solid or powdered iron field pole pieces, the combination of which forms the motor field structure. A motor field structure so constructed has the desirable and inherent advantage of being very rugged and durable, and particularly suitable for applications such as engine starter motors. However, a motor field structure for A.C. motor applications exhibits undesirable electrical characteristics, particularly high energy losses. In order to overcome this electrical disadvantage, yet maintain the ruggedness and durability of the structure, it has been found desirable to rectify the usually available A.C. current to power the solid field frame starter motor, thus eliminating the high A.C. energy losses.

Rectifier assemblies for this purpose have not lent themselves to installation in the motor housing and have thus been made as a separate unit kept apart from the starter motor and machinery used therewith. Commercial rectifier units in general have been mounted on a wall or kept indoors since they have been subject to damage caused by moisture or other foreign matter and have been subject to the problems which often plague electrical circuits under rugged use, such as, loose or broken connections. Accordingly, it is an object of the present invention to provide a unitary rectifier and control switch assembly which is completely sealed and adapted to be mounted on the motor housing or other suitable location to accompany the starter motor and machinery used therewith.

In accordance with the present invention, there is provided in combination a D.C. motor, suitable for use as a starter motor, comprising a solid housing and solid or powdered iron pole pieces. Rectifier means is provided for receiving A.C. power from a line source and converting it to D.C. power for supply to the electrical input of the motor. Switch means including an actuator is employed connected between the source of A.C. power and at least one of the input terminals of the rectifier means, the actuator being adapted to provide an electrical connection through the switch means to the input terminal. Further, housing means is provided for encapsulating and sealing the rectifier means and switch means therein, but permitting the actuator to be operatively actuatable. The housing means is preferably adapted to be attached to the motor housing. In this manner, it becomes possible to use an ordinary A.C. line source of power and yet obtain the advantages in ruggedness and durability of a D.C. motor of electrically efficient type, and at the same time provide a desirable feature of having a rugged switch and rectifier unit accompany the D.C. starter motor and machinery. The switch and rectifier unit is preferably embedded in a resinous material in the housing means and conveniently and safely located on the motor housing for ready use.

For a better understanding of these and other features and advantages of the present invention, reference is made to the following detailed description and accompanying drawings, in which:

FIG. 5 is a front elevational view, partially broken away, of the physical embodiment of the switch and rectifier assembly of FIGS. 3 and 4;

FIG. 6 is a side elevational view, partially broken away, of the structure of FIG. 5; and FIG. 7 is a sectional view of a D.C. motor suitable for use in a motor-starting system and showing the switch and rectifier unit attached to the motor housing and electrically connected to the motor.

Figure 1:
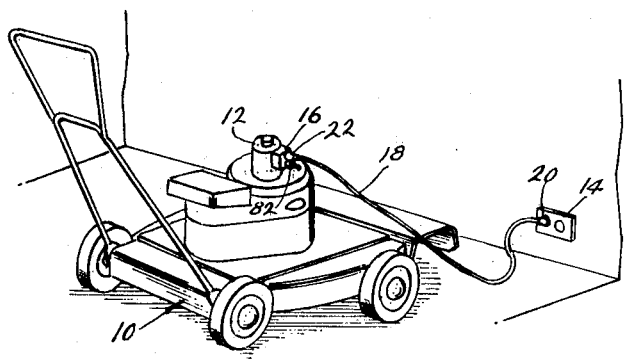
FIG. 1 is a perspective view showing generally the exterior of apparatus in accordance with the invention, connected for use.

Referring now to the drawings, FIG. 1 illustrates a gasoline-motor driven lawn mower generally designated 10 provided with a D.C. starter motor 12 mounted thereon, an outlet receptacle 14 on a wall for A.C. line voltage typically of about 115 volts, a rectifier and switch assembly 16 attached to the starter motor for converting the A.C. line voltage to a D.C. voltage, and an electrical cable 18 for connecting the rectifier and switch assembly 16 to the line source outlet receptacle 14 through the detachable plugs 20 and 22 of the cable. To start the lawn mower motor, the mower is wheeled to a position adjacent an outlet receptacle, such as receptacle 14, and the cable 18 is connected as described above. The control switch of the rectifier and switch assembly 16 is turned to its ON position to supply electrical power to the starter motor for a time sufficient to start the gasoline motor of the lawn mower, after which the switch is turned off and the cable is removed.

Figure 2:
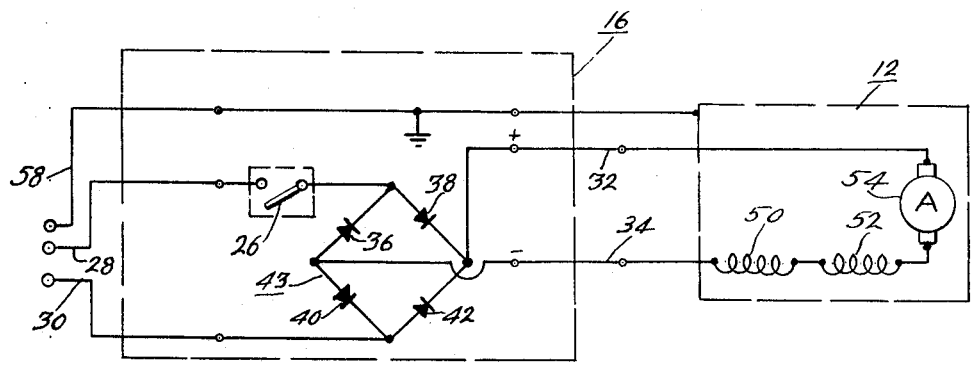
FIG. 2 is a schematic circuit diagram showing the circuit arrangement of the rectifier and switch assembly connected to the D.C. starter motor in accordance with the invention.

As shown in FIG. 2, the rectifier and switch assembly 16 is supplied across its input leads 28 and 30 with A.C. line voltage typically of 115 volts and when control switch 26 thereof, located in line 28, is closed produces across its output leads 32 and 34 a D.C. voltage typically of about 95 volts. In this example, the rectifier portion of the assembly 16 comprises four diodes 36, 38, 40 and 42 connected in a full-wave rectifier bridge circuit generally designated 43 having input terminals connected between the two sides of the A.C. line and on the side of switch 26 remote from the line source, as shown in FIG. 2. The D.C. output leads 32 and 34 are connected to output terminals of the full-wave rectifier bridge circuit 43 and are connected to the starter motor 12 across the series combination of the field windings 50 and 52 and brush and commutator assembly generally designated 54. Accordingly, when switch 26 is closed, D.C. voltage is supplied to rotate the armature of motor 12, the drive shaft of which is typically connected to the engine flywheel of the gasoline motor of the lawn mower to affect starting thereof.

As shown in FIG. 2, the interconnecting cable preferably includes a ground line 58 to which the motor housing is connected to protect against electrical shock by grounding any electrical potential which may originate from short-circuits or faulty insulation, for example.

FIGS. 5 and 6 show a typical physical arrangement of the rectifier and switch assembly of FIG. 2. The rectifier and switch assembly is encapsulated and sealed in a housing 70 in order to provide a structure completely sealed against moisture leakage and completely rigid to prevent loose or broken connections which may occur through vibration in use. More specifically, a rectifier assembly 72 is shown in FIGS. 5 and 6 comprising four silicon rectifiers 74, 76, 78 and 80 connected to form a full-wave rectifier bridge circuit. There is positioned in the housing 70 a manual control switch 82, which may be a standard toggle switch with its actuator 82a spring loaded to the OFF position. It should be understood that a pushbutton type switch or any other suitable switch could be used as long as the actuator of the switch is operatively actuatable from outside the sealed housing. Input terminals 84 and 85 for connecting the line source to the rectifier and switch assembly and terminal 86 for the electrical ground connection, protrude from the housing to be connectable with detachable plug 22 of electric cable 18. Output terminals 90 and 91 from the rectifier bridge circuit preferably protrude from the side of the housing to be adjacent to starter motor for electrical connection to input terminals of starter motor 12. An electrical strap 92 of metal, such as copper, is connected to ground terminal 86 and protrudes from the side of the housing to be adjacent the starter motor housing to contact the motor housing to protect against electrical shock by grounding any electrical potential.

Figure 3:
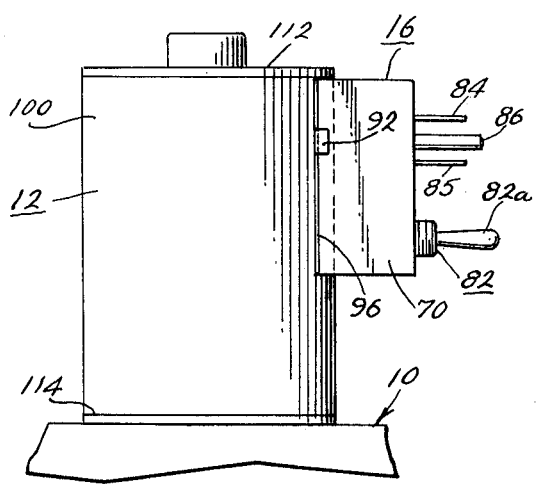
FIG. 3 is a side elevational view of a physical embodiment of the rectifier and switch assembly attached to the motor housing represented diagrammatically in FIG. 2.
Figure 4:
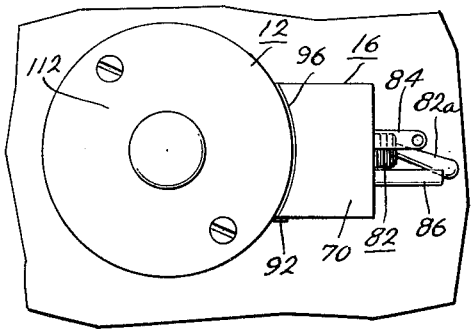
FIG. 4 is a plan view of the structure of FIG. 3.

The housing 70 for the rectifier and switch assembly may comprise a hollow casing, of Bakelite or the like, having a front and sidewalls forming a box-like structure with an open bottom. A portion of the switch 82 with actuator 82a would be mounted to protrude through the front and the input terminals 84, 85 and 86 would be mounted to protrude through the front, as shown in FIGS. 5 and 6. It is understood that the portion of the switch and input terminals could be placed in any convenient location. The output terminals 90 and 91 and ground strap 92 would be accessible through the open bottom. One pair of opposite sides of the casing would preferably have an arcuate recess adjacent the open bottom to fit snugly around the contour of the starter motor housing, as shown in FIGS. 3 and 4. Preferably, a resinous material, such as epoxy resin, in a molten state, would be poured into the casing with the switch and rectifier circuit electrically connected and located therein. The molten material would cover the portion of the switch and rectifier circuit in the casing except for a portion of output terminals 90 and 91 and ground strap 92, which extend into a recess 70a in the housing adjacent the bottom. When the molten resinous material is allowed to harden, the portion of the switch and rectifier circuit in the casing would be embedded therein in a solid, impervious housing structure, protecting the connections against breaking or loosening under heavy vibration and against moisture leakage into the casing.

The housing could also be formed as a single unitary housing structure by placing the switch and rectifier unit in a suitable mold and pouring the molten resinous material therein to form the housing 70, as shown in FIGS. 5 and 6. The input terminals 84, 85 and 86 and the actuator 82a would protrude from the casing to be operatively accessible and the output terminals 90 and 91 and strap 92 would preferably extend into recess 70a molded in the housing. Also, a pair of opposite sides forming recess 70a are preferably molded in an arcuate recess to conform to the contour of the starter motor housing, as shown in FIGS. 3 and 4. When the resinous material has cooled, a hard, impervious housing structure will rigidly hold the switch and rectifier circuit together.

The casing may be mounted to the starter motor housing, a shown in FIGS. 3 and 4, by any suitable means, such as a screw inserted through an opening 94 drilled or molded in the housing 70, shown in FIGS. 5 and 6. A gasket 96 of rubber or the like is preferably placed between the housing 70 and the starter motor housing 12 to prevent leakage of water therebetween. The ground strap 92 is secured under pressure against the starter motor housing when the rectifier and switch structure is mounted to the motor housing.

Referring to FIG. 7, the starter motor assembly 12 preferably consists of a solid, integral, tubular housing 100 into which pole pieces or shoes 102 are riveted or otherwise fastened. Around the pole pieces 102 are wound the field coils 104 and 106 in a conventional manner for a D.C. motor. Also contained within the housing 100 is an armature assembly 110 which is journalled on the cap assemblies 112 and 114. The armature has a commutator 116 mounted thereon upon which brushes 118 and 120 ride. The D.C. output terminals 90 and 91 of the switch and rectifier assembly are electrically connected to the brush and commutator assembly and field winding, as described in regard to FIG. 2. The armature of the starter motor also has a drive assembly 122 mounted on one end of its shaft for a meshing engagement with an engine flywheel of the gasoline motor to be started. The drive assembly can be of any of the conventional types.

It will be observed that the motor and rectifier system of the present invention provides a system which is easy to assemble and capable of trouble-free operation. The molded switch and rectifier assembly in accordance with the present invention provides a rugged structure capable of accompanying the starter motor and machinery used therewith and one which is sealed against moisture leakage therein. Moreover, with the switch and rectifier assembly attached to the starter motor housing accompanying the machinery, the gasoline motor may be started at any desired location at which the cable can be connected to a suitable A.C. line source outlet.

While the invention has been described with particular reference to a specific embodiment thereof, it will be understood that it may be embodied in a large variety of forms diverse from the one specifically shown and described without departing from the scope and spirit of the invention as defined by the appended claims.

I claim:

1. A motor-rectifier system for use in starting outdoor home machinery, comprising: a direct current motor; a circuit including rectifier means and having input and output terminals and being responsive to an alternating voltage from a source of power applied to the input terminals for producing a direct voltage at the output terminals; switch means including an actuator connected in the circuit, the actuator being adapted to close contacts and provide an electrical connection through the switch means to complete the circuit through the rectifier means; housing means for embedding and sealing the rectifier means and switch means therein and permitting the actuator to be operatively actuatable, the input terminals being embedded in and protruding from the housing means to provide terminals connectable to the source of power, the housing means being adapted to be attached to the motor; and circuit means for supplying the direct voltage from the output terminals to the motor to produce operation thereof.

2. The motor-rectifier system of claim 1 wherein the rectifier and switch means are embedded in a resinous material in the housing means with the actuator being operatively actuatable, the input terminals being sufficiently rigid to serve as a plug.

3. The motor-rectifier system of claim 1 wherein the housing means is attached to the motor housing and has contour to conform to the motor housing.

4. The motor-rectifier system of claim 1 further comprising an electrical conductor connectable to electrical ground and supported between the housing means and the motor housing.

5. The motor-rectifier system of claim 1 wherein the output terminals of the circuit are embedded in and protrude from the housing means to be connected to input terminals of the direct current motor.

6. A motor-driving system comprising: a first motor adapted to be started by actuation of an input member thereof; a direct current starter motor having output drive means connected to said input member of said first motor; rectifier means having input and output terminals and responsive to an alternating voltage from a source of power applied to the input terminals for producing a direct voltage at the output terminals; switch means including an actuator and having an input terminal connectable to the source of power and an output terminal connected to one of the input terminals of the rectifier means, the actuator being adapted to close contacts and provide an electrical connection through the switch means to the one of the input terminals; housing means for encapsulating and sealing the rectifier means and switch means therein, the rectifier means and switch means being imbedded in a resinous material in the housing with the actuator being operatively actuatable, the other of the input terminals of the rectifier means and the input terminal of the switch means being embedded in and protruding from the housing means to provide terminals connectable to the source of power, the output terminals of the rectifier means being embedded in and protruding from the housing means to be connected to input terminals of the direct current motor, the housing means being adapted to be attached to the starter motor; and circuit means for supplying the direct voltage from the output terminals to the starter motor to produce operation thereof for starting of the first motor.

7. A motor-rectifier system for use in starting outdoor home machinery, comprising: a direct current motor; a circuit including a rectifier and having input and output terminals and being responsive to an alternating current voltage from a source of power applied to the input terminals for producing a direct current voltage at the output terminals; switch means including an actuator for connection in the circuit and being adapted to close contacts and provide an electrical connection through the switch means to complete the circuit through the rectifier; housing means for embedding and sealing the rectifier therein and for fixedly supporting the switch means therein and permitting the actuator to be operatively actuated, the input terminals being embedded in and protruding from the housing means to provide terminals for being connected to a source of power, the housing means being attached to the motor; and circuit means for supplying the direct current voltage from the output terminals to the motor to produce operation thereof.

8. A motor-rectifier system for use in starting outdoor home machinery, comprising: a direct current motor; a circuit including a rectifier and having input and output leads and being responsive to an alternating current voltage from a source of power applied to the input leads for producing a direct current voltage at the output leads; a switch connected in the circuit being adapted to close contacts and provide an electrical connection through the switch to complete the circuit through the rectifier; housing means for embedding and sealing the rectifier therein, the circuit input leads being embedded in and protruding from the housing means for being connected to a source of power, and circuit means connecting the housing means and motor together for supplying the direct current voltage from the output leads to the motor to produce operation thereof.

References Cited

UNITED STATES PATENTS

| | | | |
|---|---|---|---|
| 3,356,873 | 12/1967 | Tamm | 310—66 |
| 3,271,579 | 9/1966 | Erismann | 290—38 |
| 3,175,095 | 3/1965 | Denniston | 290—38 |
| 2,874,309 | 2/1959 | Staak | 290—38 |
| 2,137,894 | 11/1938 | Elder | 290—38 |
| 1,980,602 | 11/1934 | Brockway | 290—38 |
| 1,795,030 | 3/1931 | Martineau | 290—38 |
| 1,760,874 | 6/1930 | Lansing | 290—38 |
| 1,447,464 | 3/1923 | Friedrichs | 290—38 |
| 3,329,881 | 7/1967 | Tolmie | 310—50 |
| 3,336,490 | 8/1967 | Velpo | 310—50 |
| 3,405,293 | 10/1968 | Burkett | 290—38 |

J. D. MILLER, Primary Examiner

U.S. Cl. X.R.

32—254; 290—38; 310—74